(12) United States Patent
Laurent et al.

(10) Patent No.: US 11,409,641 B1
(45) Date of Patent: Aug. 9, 2022

(54) MUTATION TESTING OF DATABASE FUNCTIONS

(71) Applicant: FMR LLC, Boston, MA (US)

(72) Inventors: Thomas Laurent, Dublin (IE); Garry O'Gorman, County Kilkenny (IE); Eoghan Mcelwee, Dalkey (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/393,240

(22) Filed: Aug. 3, 2021

(51) Int. Cl.
*G06F 9/44* (2018.01)
*G06F 11/36* (2006.01)
*G06F 16/215* (2019.01)
*G06F 11/14* (2006.01)

(52) U.S. Cl.
CPC ...... *G06F 11/3684* (2013.01); *G06F 11/1469* (2013.01); *G06F 11/3644* (2013.01); *G06F 11/3688* (2013.01); *G06F 16/215* (2019.01); *G06F 2201/80* (2013.01)

(58) Field of Classification Search
CPC .............. G06F 11/3684; G06F 16/215; G06F 11/1469; G06F 11/3644; G06F 11/3688; G06F 2201/80
See application file for complete search history.

(56) References Cited

U.S. PATENT DOCUMENTS

| | | | | |
|---|---|---|---|---|
| 5,566,329 A | * | 10/1996 | Gainer | G06F 16/284 |
| 10,642,723 B1 | * | 5/2020 | Krishnamoorthy | G06F 8/30 |
| 10,642,726 B2 | | 5/2020 | Abhishek | |
| 10,705,949 B2 | | 7/2020 | Krishnan et al. | |
| 2003/0229889 A1 | * | 12/2003 | Kuzmin | G06F 11/3676 717/130 |
| 2005/0223357 A1 | * | 10/2005 | Banerjee | G06F 11/3676 714/E11.207 |
| 2013/0152043 A1 | * | 6/2013 | Kuzmin | G06F 11/3676 717/110 |

(Continued)

OTHER PUBLICATIONS

Sarkar, Tanmoy, "Testing database applications using coverage analysis and mutation analysis," (2013), Graduate Theses and Dissertations, 13308, available at https://lib.dr.iastate.edu/etd/13308, 97 pages.

*Primary Examiner* — Hang Pan
(74) *Attorney, Agent, or Firm* — Proskauer Rose LLP

(57) ABSTRACT

Methods and apparatuses are described for mutation testing of database functions. A computing device identifies database functions for testing from at least one database. The computing device generates, for each identified database function, mutated database functions by automatically applying mutations to the identified database function that change aspects of the identified database function. The computing device deploys the mutated database functions to the at least one database. The computing device determines line coverage attributes associated with each mutated database function. The computing device selects tests for execution against each mutated database function based upon the line coverage attributes associated with each mutated database function. The computing device executes the selected tests against each mutated database function using test automation applications to determine an outcome associated with each test. The computing device generates an output file comprising the outcome associated with each test executed against the mutated database functions.

22 Claims, 6 Drawing Sheets

(56) References Cited

U.S. PATENT DOCUMENTS

2013/0159353 A1* 6/2013 Fuh .................... G06F 21/6254
707/E17.044
2019/0138433 A1* 5/2019 Krishnan ............ G06F 11/3684

* cited by examiner

MUTATION TESTING OF DATABASE FUNCTIONS

TECHNICAL FIELD

This application relates generally to methods and apparatuses, including computer program products, for mutation testing of database functions.

BACKGROUND

Automated testing and analysis of complex computer software source code using test automation frameworks is crucial to understanding the functional impact of source code changes across a wide variety of systems in a timely and efficient manner. Typically, these test automation frameworks execute test scripts against software in development to identify errors, bugs, and other defects with the software before it is deployed to a production computing environment. Such testing is not limited to application source code but also extends to other types of code, including database functions like stored procedures.

However, it is important to also analyze the test scripts used by the above-mentioned test automation frameworks to ensure that the test scripts provide adequate line coverage for database function testing so that code is not missed during testing. Further, it is vital that the test scripts are able to detect certain errors or problems in database functions, so that database functions with these errors are not inadvertently released to the production computing environment—which could lead to downtime, instability, or data loss. Existing systems for analyzing test scripts used in database function testing lack mechanisms to generate variations of database functions (also called mutations) containing specific changes that should be detected by the test automation framework. Existing systems are also database-/vendor-specific and/or test framework-specific, which limits the applicability and flexibility of such systems.

SUMMARY

Therefore, what is needed are methods and systems for mutation testing of database functions, like stored procedures, to enable efficient and accurate determination of both line coverage for database function testing and for ensuring complete detection of mutations in database functions. The techniques described herein advantageously provide an automated way to generate mutated database functions for execution by test automation suites to validate the accuracy and robustness of existing test scripts, while also providing a detailed visualization of the outcome of such mutation testing that assists developers and engineers in remediating deficiencies in test scripts and/or database functions themselves. The methods and systems described herein further provide a flexible and adaptable database function testing environment that is applicable to multiple databases and test frameworks (e.g., Postgres & Oracle unit tests, Cucumber behavioral tests, and the like).

The invention, in one aspect, features a computer system for mutation testing of database functions. The system comprises a computing device having a memory that stores computer-executable instructions and a processor that executes the computer-executable instructions to. The computing device identifies one or more database functions for testing from at least one database. The computing device generates, for each identified database function, one or more mutated database functions by automatically applying one or more mutations to the identified database function that change one or more aspects of the identified database function. The computing device deploys the mutated database functions to the at least one database. The computing device determines line coverage attributes associated with each mutated database function. The computing device selects one or more tests for execution against each mutated database function based upon the line coverage attributes associated with each mutated database function. The computing device executes the selected tests against each mutated database function using one or more test automation applications to determine an outcome associated with each test executed against the mutated database functions. The computing device generates an output file comprising the outcome associated with each test executed against the mutated database functions for display on a remote computing device.

The invention, in another aspect, features a computerized method of mutation testing of database functions. A computing device identifies one or more database functions for testing from at least one database. The computing device generates, for each identified database function, one or more mutated database functions by automatically applying one or more mutations to the identified database function that change one or more aspects of the identified database function. The computing device deploys the mutated database functions to the at least one database. The computing device determines line coverage attributes associated with each mutated database function. The computing device selects one or more tests for execution against each mutated database function based upon the line coverage attributes associated with each mutated database function. The computing device executes the selected tests against each mutated database function using one or more test automation applications to determine an outcome associated with each test executed against the mutated database functions. The computing device generates an output file comprising the outcome associated with each test executed against the mutated database functions for display on a remote computing device.

Any of the above aspects can include one or more of the following features. In some embodiments, the one or more database functions comprise database stored procedures. In some embodiments, automatically applying one or more mutations to the identified database function that change one or more aspects of the identified database function comprises deleting one or more of: a statement in the identified database function, an operator in the identified database function, a negation value in the identified database function, a keyword in the identified database function, or a clause in the identified database function. In some embodiments, automatically applying one or more mutations to the identified database function that change one or more aspects of the identified database function comprises replacing a first operator in the identified database function with one or more other operators. In some embodiments, the computing device adds one or more instrumentation probes into each identified database function prior to executing the one or more tests, the instrumentation probes recording at least one data element upon execution of the one or more tests against the identified database function.

In some embodiments, deploying the mutated database functions to the at least one database comprises: creating a backup copy of each identified database function; and replacing each identified database function in the at least one database with the corresponding one or more mutated database functions. In some embodiments, after executing the one or more tests of each mutated database function, the server computing device restores each identified database function to the at least one database using the corresponding backup copy.

In some embodiments, the outcome associated with each selected mutated database function comprises an indicator of success associated with execution of the selected mutated database function or an indicator of failure associated with execution of the selected mutation database function. In some embodiments, the computing device executes one or more tests against one or more of the mutated database functions to determine the line coverage attributes associated with each mutated database function. In some embodiments, the line coverage attributes comprise a percentage of lines of the corresponding mutated database function that are executed by the one or more tests.

In some embodiments, the output file comprises the line coverage attributes. In some embodiments, the output file comprises one or more HTML files that are used to generate a visual representation of one or more of the line coverage attributes or the outcome. In some embodiments, the at least one database includes a relational database.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
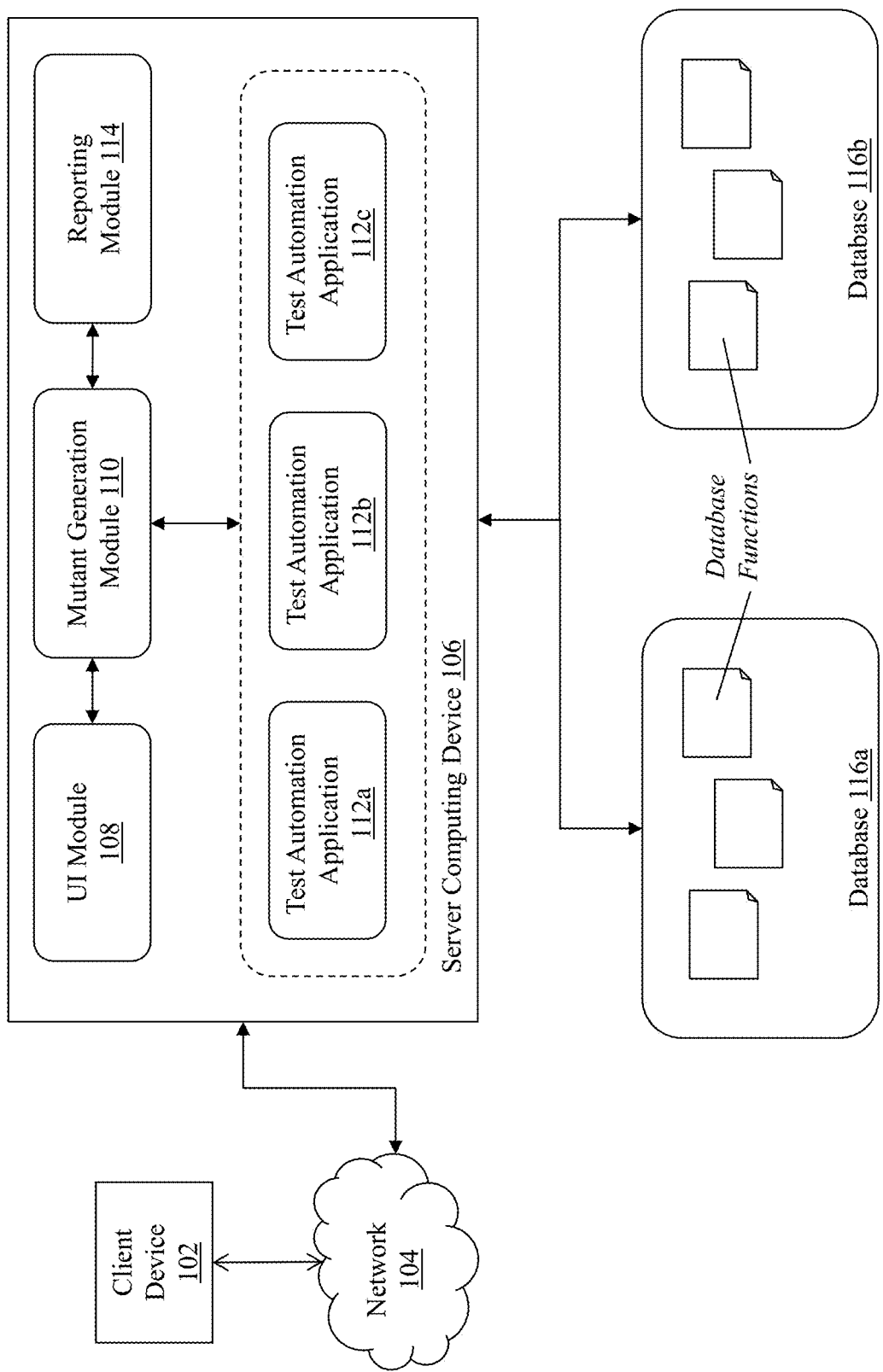
FIG. 1 is a block diagram of a system for mutation testing of database functions.

FIG. 1 is a block diagram of a system 100 for mutation testing of database functions. The system 100 includes one or more client computing devices (e.g., client device 102) that is coupled via communications network 104 to the server computing device 106. The server computing device 106 includes a UI module 108, a mutant generation module 110, a plurality of test automation applications 112a-112c, and a reporting module 114. The server computing device is coupled to a plurality of databases 116a-116b, and each database 116a-116b stores one or more database functions.

The client computing device 102 connects to the communications network 104 in order to communicate with the server computing device 106 to provide input and receive output relating to the process of mutation testing of database functions as described herein. In some embodiments, the client computing device 102 is coupled to a display device (not shown). For example, the client computing device 102 can provide a detailed graphical user interface (GUI) via the display device that presents output resulting from the methods and systems described herein, where the GUI is utilized by an operator to review data associated with the process of mutation testing of database functions.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables the other components of the system 100 to communicate with each other in order to perform the process of mutation testing of database functions as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as UI module 108, mutant generation module 110, test automation applications 112a-112c, and reporting module 114 that execute on the processor of the server computing device 106, to receive data from other components of the system 100, transmit data to other components of the system 100, and perform functions for mutation testing of database functions as described herein.

In some embodiments, the modules and applications 108 through 114 are specialized sets of computer software instructions programmed onto a dedicated processor in the server computing device 106 and can include specifically-designated memory locations and/or registers for executing the specialized computer software instructions. Further explanation of the specific processing performed by the modules and tools 108 through 114 will be provided throughout the specification.

In some embodiments, the server computing device 106 includes and/or is connected to a build automation tool, such as Apache Maven™, that enables a developer to build tests to be used with the test automation applications 112a-112c, manage test dependencies, and the like. As can be appreciated, the mutant generation module 110 can comprise one or more plugins (e.g., Maven™ plugin) that interface with the build automation tool to perform the functions described herein.

Generally, the test automation applications 112a-112c are software tools that enable execution of automation test scripts with respect to functionality of the one or more databases 116a-116b. In one example, the test automation applications 112a-112c execute code that tests one or more database functions of databases 116a-116b). In this context, a database function can be a stored procedure (i.e., a precompiled set of database statements that perform a specific task), although other types of database functions can be executed as well. Exemplary test automation applications 112a-112c for use with the system 100 are utPLSQL™ available from utplsql.org, pgTAP™ available from pgtap.org, and Cucumber™ available from cucumber.io, although other types of test automation applications can be contemplated within the scope of invention. In some embodiments, each test automation application 112a-112c is configured to interface with a different type of database 116a-116b. For example, test automation application 112a may be configured to execute tests only on database 116a. While FIG. 1 shows three test automation applications 112a-112c, it should be appreciated that the system 100 can contain one or more test automation applications.

The databases 116a-116b comprise transient and/or persistent memory for data storage, that is used in conjunction with the process of mutation testing of database functions as described herein. In some embodiments, each database 116a-116b is a computing device (or in some embodiments, a set of computing devices) coupled to the server computing device 106 and is configured to receive, generate, and store specific segments of data relating to the process of mutation testing of database functions as described herein. In some embodiments, all or a portion of the databases 116a-116b can be integrated with the server computing device 106 or be located on a separate computing device or devices. The databases 116a-116b can comprise one or more databases configured to store portions of data used by the other components of the system 100, as will be described in greater detail below. In some embodiments, the databases 116a-116b comprise relational databases, such as Oracle™ 19c (available from Oracle Corporation of Austin, Tex.) or PostgreSQL™, an open source database system available at postgresql.org—although other types and versions of relational databases can be used within the scope of invention.

Figure 2:
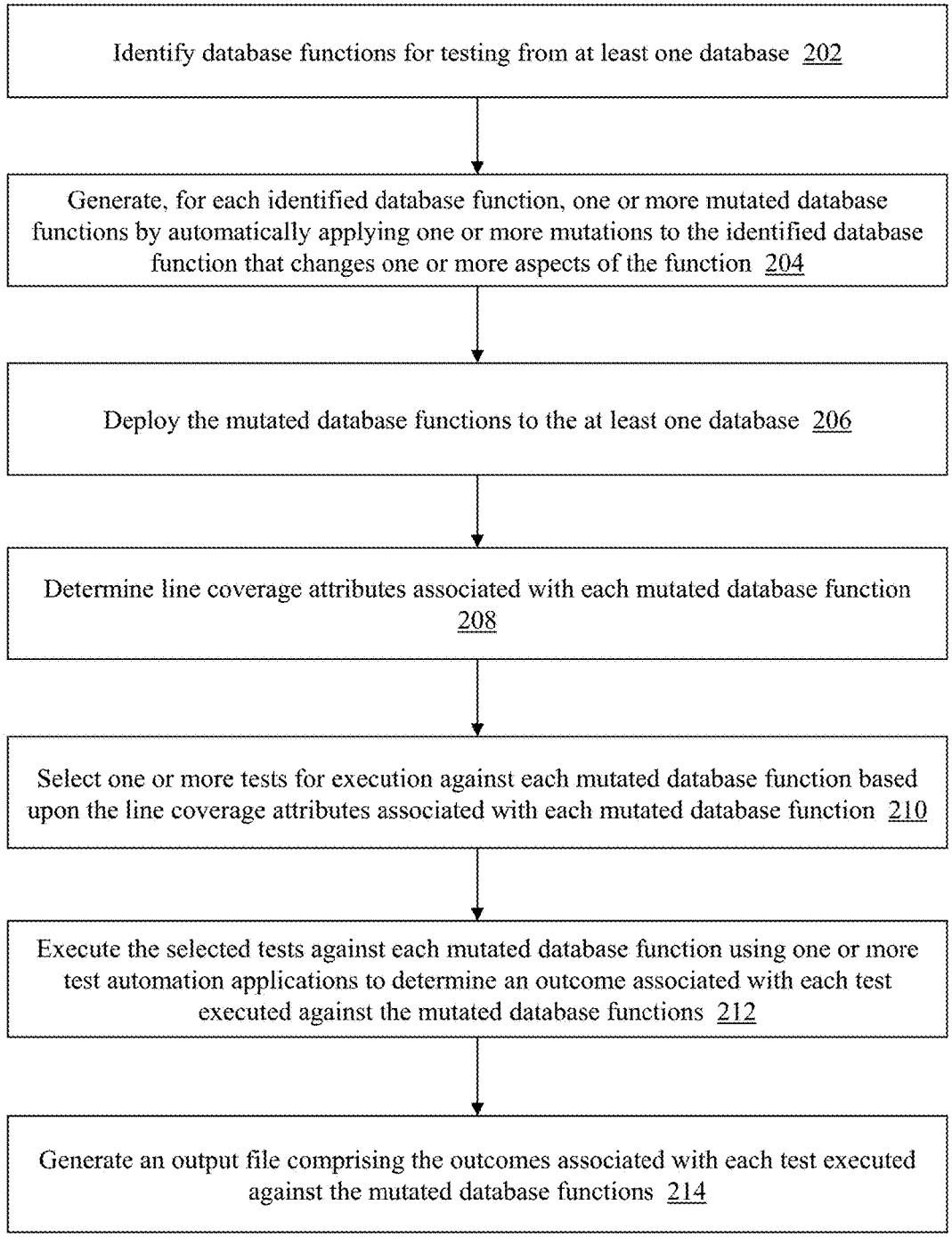
FIG. 2 is a flow diagram of a computerized method of mutation testing of database functions.

FIG. 2 is a flow diagram of a computerized method 200 of mutation testing of database functions, using the system 100 of FIG. 1. In one embodiment, a user at client computing device 102 issues a command to server computing device 106 for mutation testing of database functions in one or more of the databases 116a-116b. For example, the UI module 108 can communicate with the client computing device 102 (e.g., via network 104) to provide a graphical user interface in which the user can initiate the mutation testing. The mutant generation module 110 identifies (202) one or more database functions for testing from at least one of the databases 116a-116b. For example, the mutant generation module 110 can identify database functions for testing automatically (e.g., by identifying recently-added and/or recently-modified database functions, or by identifying database functions that are associated with applications that may be under test and/or used by high-impact or high-priority production systems). In another example, the mutant generation module 110 can receive instructions from client computing device 102 that indicate one or more database functions to be tested. The identified database functions are copied from and/or retrieved from the corresponding database(s) 116a-116b and stored locally in the mutant generation module 110 and/or test automation application(s) 112a-112c.

For each database function that is identified as described above, the mutant generation module 110 generates (204) one or more mutated database functions by automatically applying one or more mutations to each identified database function that changes one or more aspects of the identified database function. As mentioned above, a mutation is generally a change of the existing code for the database function to generate a new database function that comprises a modified version of the original function that typically executes differently than the original. For example, a mutation may comprise a change to an operator or an expression in the database function that alters the evaluation of conditions in the operator (e.g., making a condition inclusive or exclusive). Further details about mutations are described in (1) J. Tuya et al., "Mutating database queries," Information and Software Technology, 49(4), 398-417 (2007), doi: 10.1016/j.insof.2006.06.009, and (2) Mutation Operators Overview, available from pitest.org/quickstart/mutators, each of which is incorporated herein by reference. In some embodiments, the mutant generation module 110 can determine which mutations to apply to a particular database function based upon input provided by the user of client computing device 102 (e.g., via input parameters). In some embodiments, the mutant generation module 110 can be configured to utilize a default set of operators if no other instructions are provided by the user, and the default set of operators can be a subset of all available operators that is designed to create a defined number of mutants (which in some cases are considered to be high-impact mutants). It should be appreciated that other methodologies for determining which mutations to apply can be used within the scope of the technology described herein.

Some exemplary mutators that can be used by the mutant generation module 110 to create mutated database functions include, but are not limited to:

BTW (PostgreSQL)—this mutator replaces the [NOT] BETWEEN operator by two conditions, making one of the conditions inclusive, e.g. WHERE x BETWEEN 0 AND 42 is mutated to WHERE x>=0 AND x<42 and to WHERE x>0 and x<=42.

DEL (PostgreSQL, PLSQL)—This mutator deletes one statement in the function. e.g.:

. . .
IF condition THEN
statement;
END IF;
. . .

Will be mutated to (deleting the inner statement):

. . .
IF condition THEN
END IF;
. . .

And/or further mutated to (deleting the whole IF statement):

. . .
. . .

DELETE WHERE (PostgreSQL, PLSQL)—this mutator deletes the WHERE clause in a query, e.g. SELECT*from table WHERE id=42; is mutated to SELECT*from table;

GRU (PostgreSQL)—This mutator deletes a GROUP BY element, or the whole clause if there is only one element, e.g. SELECT a, AVG(c) FROM t GROUP BY a, b; is mutated to SELECT a, AVG(c) FROM t GROUP BY a; and SELECT a, AVG(c) FROM t GROUP BY b;

INVERT NEG (PostgreSQL)—this mutator deletes the negation of a numeric literal or variable, e.g. SELECT—amount FROM t; is mutated to SELECT amount FROM t;

JOT (PostgreSQL)—this mutator replaces each of JOIN, CROSS JOIN, LEFT JOIN, RIGHT JOIN, FULL JOIN with the others, creating 4 mutants for each. e.g. SELECT*FROM t1 JOIN t2 ON t1.a=t2.b; will be mutated to SELECT*FROM t1 CROSS JOIN t2; and SELECT*FROM t1 LEFT JOIN t2 ON t1.a=t2.b; etc.

LCR (PostgreSQL, PLSQL)—this mutator replaces AND and OR by each other, by only the left-side condition, only the right-side condition, by true, and by false. e.g., IF c1 AND c2 THEN will be mutated to IF c1 OR c2 THEN, and to IF c1 THEN, and to IF true THEN, etc. Parentheses are added to make the mutation more readable, e.g. IF c1 AND c2 and c3 THEN will be mutated to IF c1 OR (c2 and c3) THEN etc.

LKE (PostgreSQL)—this mutator replaces the LIKE and NOT LIKE operators with each other.

MATH (PostgreSQL, PLSQL)—this mutator changes a mathematical operation, following the replacement table below, as well as to only the left or right member, e.g. c=a+b; is mutated to c=a−b; and to c=a; and to c=b.

| Original | Replacement |
|---|---|
| + | − |
| − | + |
| * | / |
| / | * |
| % | * |
| ^ | * |

NLF (PostgreSQL, PLSQL)—this mutator replaces the IS NULL and IS NOT NULL operators with each other.

ORD (PostgreSQL)—this mutator replaces ASC and DESC with each other, e.g. SELECT*FROM t ORDER BY a ASC; is mutated to SELECT*FROM t ORDER BY a DESC;

ROR (PostgreSQL, PLSQL)—this mutator changes a relational operator, following the replacement table below, as well as replacing the comparison by TRUE and FALSE, e.g.: WHERE a>42 is mutated to WHERE a>=42, and to WHERE TRUE, and to WHERE FALSE.

| Original | Replacement |
|---|---|
| < | <= |
| <= | < |
| > | >= |
| >= | > |
| !=,<> | = |
| = | != |

SEL (PostgreSQL)—this mutator replaces every instance of SELECT with SELECT DISTINCT, and vice versa, e.g. SELECT*from table; is mutated to SELECT DISTINCT*from table;

SUB (PostgreSQL)—this mutator mutates the following keywords: ALL, ANY SOME, [NOT] IN, [NOT] EXISTS, and is divided in three sub operators:
- SUB_1—this mutator mutates the ALL, ANY and SOME keywords, by replacing them with each other, or with the IN, NOT IN, EXISTS, NOT EXISTS operators. e.g. SELECT*FROM t WHERE a>ALL (subquery); is mutated to SELECT*FROM t WHERE a>ANY (subquery); and SELECT*FROM t WHERE a IN (subquery); and SELECT*FROM t WHERE EXISTS (subquery); etc.
- SUB_2—this mutator mutates the IN and NOT IN keywords by replacing them with each other and the EXISTS and NOT EXISTS keywords.
- SUB_3—this mutator mutates the EXISTS and NOT EXISTS keywords by replacing them with each other.

UNI (PostgreSQL)—this mutator mutates the UNION and UNION ALL keywords by replacing them with each other, the left side of the UNION and the right side of the union, e.g. SELECT*FROM sub q1 UNION sub q2; is mutated to SELECT*FROM sub q1 UNION ALL sub q2; and to SELECT*FROM sub q1; and to SELECT*FROM sub q2.

It should be appreciated that the above mutators are merely exemplary, and other types and/or forms of mutators can be envisioned within the scope of the technology described herein. Also, in some embodiments, the mutations in each database function are instrumented with probes in order for the module 110 to detect whether the mutations are executed or not.

Once the mutated database functions are generated by the mutant generation module 110, the module 110 deploys (206) the mutated functions to one or more of the databases 116a-116b so the mutated functions can be tested. In some embodiments, the module 110 deploys the mutated functions to the database by (a) generating a backup of the original database functions (e.g. stored locally at server computing device 106); (b) deleting the original database functions from the database and writing the mutated database functions to the database; and (c) when testing is complete, deleting the mutated database functions from the database and restoring the original functions to the database. In the event of errors or other problems during execution of the tests, the backup copy of the original database functions can be restored by the mutant generation module 110 to avoid corruption of the database or loss of the original functions.

In some embodiments, the mutant generation module 110 can deploy a first mutated database function to the database (after creating the backup copy), execute testing on the mutated database function, then replace the mutated function with the original backup copy. Then, the mutant generation module 110 can deploy another mutated database function to the database, execute testing on the currently-deployed mutated database function, then replace this mutated function with the original backup copy. In other embodiments, the mutant generation module 110 can deploy multiple different mutated database functions to the databases 116a-116b at the same time and test them sequentially or concurrently.

Once the mutated database functions to be tested are deployed, the mutant generation module 110 determines (208) line coverage attributes associated with each mutated database function that is deployed. As can be appreciated, line coverage relates to the number of lines of database functions that are parsed/executed during automated testing of the database functions so that developers/engineers can determine whether certain sections of the code are executed or not. In some embodiments, the mutant generation module 110 in conjunction with one or more of the test automation applications 112a-112c inserts instrumentation (e.g., probe statements) in the code of the database functions in order to capture data elements (including but not limited to line coverage attributes) during execution of the tests. For example, the probes are inserted automatically at certain junctures in the code so that the mutant generation module 110 can monitor how much of the database function code is executed during the tests. When executed, in some embodiments the probes can write a record (e.g., probe name, line number, timestamp, etc.) to a table, a log or an output file that confirms the probe was parsed and executed by the test automation application 112a-112c during one or more tests.

Below are examples of functions used by the mutant generation module 110 to instrument the code for performing line coverage based upon the particular test automation application:

Line Coverage—Cucumber

In one example, the mutant generation module 110 can include functionality that measures the line coverage achieved by Cucumber tests. The module 110 adds probes (e.g. insert statements that add a record in the probes table every time the insert statements are run) before each statement in the database function and executes the test suite. This functionality can utilize the following parameters:

<dbURL>(-DdbURL)—the URL of the database being tested;

<features>(-Dcucumber.features)—the path to a directory containing the feature files to run or to a feature file to run;

<glue>(-Dcucumber.glue)—the package name for the Cucumber glue code;

<backupDir>(-DbackupDir, defaults to functions bck)—the folder where the definitions of the functions in the database will be backed up. If a relative path is given, the directory will be created under Maven's target folder;

<dbLogin>(-DdbLogin)—the account used to connect to the database; required except if using Kerberos;

<dbPassword>(-DdbPassword)—the password used to connect to the database; required except if using Kerberos;

<excludeFunctionName>(-DexcludeFunctionName)—Regex that is used to filter which functions are mutated. Functions with a name matching this regex will not be mutated;

<excludeFunctionSchema>(-DexcludeFunctionSchema)—Regex that is used to filter which functions are mutated. Functions in schemas matching this regex will not be mutated;

<includeFunctionName>(-DincludeFunctionName)—Regex that is used to filter which functions are mutated. Only functions with a name matching this regex will be mutated. If not set or empty, all user defined functions will be mutated;

<includeFunctionSchema>(-DincludeFunctionSchema)—Regex that will be used to filter which functions are mutated. Only function in schemas matching this regex will be mutated. If not set or empty, user defined functions from all schemas will be mutated;

<kerberosConfig>(-DkerberosConfig)—Path to a Kerberos config file; system default used if not set;

<kerberosTicket>(-DkerberosTicket)—Path to the Kerberos ticket to use for connection if Kerberos is used;

<nameFilter>(-Dcucumber.filter.name)—Only scenarios matching the filter (regex) will be run;

<outputFormats>(-DoutputFormats, defaults to HTML)—List of formats in which to produce a report (e.g. XML and/or HTML);

<probesSchema>(-DprobesSchema, defaults to mutation)—the schema where the probes table is located. If empty, the table will not be qualified with a schema and will be in the database's default schema; note that the schema needs to exist in the database;

<probesTable>(-DprobesTable, defaults to probe_hits_table)—the name of the probes table; note that if this table already exists in the database it will be deleted;

<serviceName>(-DserviceName)—Service name to connect to Oracle database;

<sid>(-Dsid)—SID to connect to Oracle database;

<skipCoverage>(-DskipCoverage, defaults to false)—if set to true the plugin will do nothing;

<tags>(-Dcucumber.filter.tags)—Only scenarios matching this Cucumber tag expression will be run.

Line Coverage—pgTAP or utPLSQL

In another example, the mutant generation module 110 can include functionality that measures the line coverage achieved by pgTAP or utPLSQL tests. The module 110 adds probes (e.g. insert statements that add a record in the probes table every time the insert statements are run, or RAISE NOTICE statements that print a message every time they are run) before each statement in the database function and executes the test suite. This functionality can utilize the following parameters:

<dbURL>(-DdbURL)—the URL of the database being tested;

<backupDir>(-DbackupDir, defaults to functions bck)—the folder where the definitions of the functions in the database will be backed up. If a relative path is given, the directory will be created under Maven's target folder;

<dbLogin>(-DdbLogin)—the account used to connect to the database; required except if using Kerberos;

<dbPassword>(-DdbPassword)—the password used to connect to the database; required except if using Kerberos;

<excludeFunctionName>(-DexcludeFunctionName)—Regex that is used to filter which functions are mutated. Functions with a name matching this regex will not be mutated;

<excludeFunctionSchema>(-DexcludeFunctionSchema)—Regex that is used to filter which functions are mutated. Functions in schemas matching this regex will not be mutated;

<includeFunctionName>(-DincludeFunctionName)—Regex that is used to filter which functions are mutated. Only functions with a name matching this regex will be mutated. If not set or empty, all user defined functions will be mutated;

<includeFunctionSchema>(-DincludeFunctionSchema)—Regex that will be used to filter which functions are mutated. Only function in schemas matching this regex will be mutated. If not set or empty, user defined functions from all schemas will be mutated;

<kerberosConfig>(-DkerberosConfig)—Path to a Kerberos config file; system default used if not set;

<kerberosTicket>(-DkerberosTicket)—Path to the Kerberos ticket to use for connection if Kerberos is used;

<outputFormats>(-DoutputFormats, defaults to HTML)—List of formats in which to produce a report (e.g. XML and/or HTML);

<serviceName>(-DserviceName)—Service name to connect to Oracle database;

<sid>(-Dsid)—SID to connect to Oracle database;

<skipCoverage>(-DskipCoverage, defaults to false)—if set to true the plugin will do nothing;

<testNames>(-DtestNames)—List of test packages or functions to run; if not set all tests in the test schema will be run;

<testSchema>(-DtestSchema)—Schema containing the tests to run; if not set, will run all tests that the user can run.

In some embodiments, as output, the line coverage function generates an XML file and/or a folder containing HTML file(s) of the line coverage attributes. The reporting module 114 can access the XML/HTML at the conclusion of the testing and generate a report that details how much of the database function was executed so that the module 110 and/or a user a client computing device 102 can determine whether there are any gaps in test coverage (e.g., if a probe output does not appear in the log file, then corresponding code in the database function may not have been executed during the tests). Using the information from the line coverage testing, the mutant generation module 110 and/or the user at client computing device 102 can determine which tests to execute against certain mutated database function(s) as will be explained below.

Based upon the line coverage attributes, the mutant generation module 110 selects (210) one or more tests for execution against each mutated database function based upon the line coverage attributes associated with each mutated database function. For example, where the line coverage attributes for one of the database functions indicate that a specific portion of the mutated database function will not be executed during testing using one or more particular tests, the mutant generation module 110 (and/or the user at client computing device 102) can filter out one or more tests that will not be executed against the mutated database function—because execution of those tests will not result in evaluation of the mutated code. However, in some embodiments, the mutant generation module 110 can decide to execute one or more tests even though the line coverage attributes indicate that portions of the function will not be tested, at least because mutation of the database function (e.g., removing or changing a conditional statement) may enable the untested portion of the database function to be executed, thereby providing additional detail to the developers on the performance of the database function.

Once the mutated database functions are deployed and the tests are selected, the mutant generation module 110 in conjunction with one or more of the test automation applications 112a-112c executes (212) one or more of the tests against each mutated database function deployed to the databases 116a-116b to determine an outcome associated with each function.

In some embodiments, an outcome associated with each mutated database function comprises an indication of success associated with execution of the test or an indication of failure associated with execution of the test. For example, a mutation in the database function may cause the test to fail (e.g., because the mutation results in an invalid operation or value, etc.). The mutant generation module 110 in conjunction with the test automation applications 112a-112c can detect the failure and write one or more data elements to an output file. Likewise, if a given test completes successfully even when testing a mutated database function, the module 110 can detect the success and write data elements to the output file. It should be appreciated that other embodiments can utilize different data elements for recordation in the output file (e.g., using instrumentation embedded in the mutated database function).

Like the line coverage testing described previously, the mutant generation module 110 can use functionality to detect data elements while executing the test suite (e.g., Cucumber or pgTAP/utPLSQL) against the mutated database functions. This functionality can utilize the following parameters:

Mutation Coverage—Cucumber
<dbURL>(-DdbURL)—the URL of the database being tested;
<features>(-Dcucumber.features)—the path to a directory containing the feature files to run or to a feature file to run;
<glue>(-Dcucumber.glue)—the package name for the Cucumber glue code;
<backupDir>(-DbackupDir, defaults to functions bck)—the folder where the definitions of the functions in the database will be backed up. If a relative path is given, the directory will be created under Maven's target folder;
<dbLogin>(-DdbLogin)—the account used to connect to the database; required except if using Kerberos;
<dbPassword>(-DdbPassword)—the password used to connect to the database; required except if using Kerberos;
<excludeFunctionName>(-DexcludeFunctionName)—Regex that is used to filter which functions are mutated. Functions with a name matching this regex will not be mutated;
<excludeFunctionSchema>(-DexcludeFunctionSchema)—Regex that is used to filter which functions are mutated. Functions in schemas matching this regex will not be mutated;
<includeFunctionName>(-DincludeFunctionName)—Regex that is used to filter which functions are mutated. Only functions with a name matching this regex will be mutated. If not set or empty, all user defined functions will be mutated;
<includeFunctionSchema>(-DincludeFunctionSchema)—Regex that will be used to filter which functions are mutated. Only function in schemas matching this regex will be mutated. If not set or empty, user defined functions from all schemas will be mutated;
<mutators>(-Dmutators, defaults to DEFAULTS)—list of mutators that are used in the analysis;
<kerberosConfig>(-DkerberosConfig)—Path to a Kerberos config file; system default used if not set;
<kerberosTicket>(-DkerberosTicket)—Path to the Kerberos ticket to use for connection if Kerberos is used;
<nameFilter>(-Dcucumber.filter.name)—Only scenarios matching the filter (regex) will be run;
<outputFormats>(-DoutputFormats, defaults to HTML)—List of formats in which to produce a report (e.g. XML and/or HTML);
<probesSchema>(-DprobesSchema, defaults to mutation)—the schema where the probes table is located. If empty, the table will not be qualified with a schema and will be in the database's default schema; note that the schema needs to exist in the database;
<probesTable>(-DprobesTable, defaults to probe_hits_table)—the name of the probes table; note that if this table already exists in the database it will be deleted;
<serviceName>(-DserviceName)—Service name to connect to Oracle database;
<sid>(-Dsid)—SID to connect to Oracle database;
<skipCoverage>(-DskipCoverage, defaults to false)—if set to true the plugin will do nothing;
<tags>(-Dcucumber.filter.tags)—Only scenarios matching this Cucumber tag expression will be run.

Mutation Coverage—pgTAB or utPLSQL
<dbURL>(-DdbURL)—the URL of the database being tested;
<backupDir>(-DbackupDir, defaults to functions bck)—the folder where the definitions of the functions in the database will be backed up. If a relative path is given, the directory will be created under Maven's target folder;
<dbLogin>(-DdbLogin)—the account used to connect to the database; required except if using Kerberos;
<dbPassword>(-DdbPassword)—the password used to connect to the database; required except if using Kerberos;
<excludeFunctionName>(-DexcludeFunctionName)—Regex that is used to filter which functions are mutated. Functions with a name matching this regex will not be mutated;

<excludeFunctionSchema>(-DexcludeFunction-Schema)—Regex that is used to filter which functions are mutated. Functions in schemas matching this regex will not be mutated;

<includeFunctionName>(-DincludeFunctionName)—Regex that is used to filter which functions are mutated. Only functions with a name matching this regex will be mutated. If not set or empty, all user defined functions will be mutated;

<includeFunctionSchema>(-DincludeFunction-Schema)—Regex that will be used to filter which functions are mutated. Only function in schemas matching this regex will be mutated. If not set or empty, user defined functions from all schemas will be mutated;

<mutators>(-Dmutators, defaults to DEFAULTS)—list of mutators that are used in the analysis;

<kerberosConfig>(-DkerberosConfig)—Path to a Kerberos config file; system default used if not set;

<kerberosTicket>(-DkerberosTicket)—Path to the Kerberos ticket to use for connection if Kerberos is used;

<outputFormats>(-DoutputFormats, defaults to HTML)—List of formats in which to produce a report (e.g. XML and/or HTML);

<serviceName>(-DserviceName)—Service name to connect to Oracle database;

<sid>(-Dsid)—SID to connect to Oracle database;

<skipCoverage>(-DskipCoverage, defaults to false)—if set to true the plugin will do nothing;

<testNames>(-DtestNames)—List of test packages or functions to run; if not set all tests in the test schema will be run;

<testSchema>(-DtestSchema)—Schema containing the tests to run; if not set, will run all tests that the user can run.

As output, the mutation coverage function generates an XML file and/or a folder containing HTML file(s) of the mutation coverage attributes. The reporting module 114 can access the XML/HTML at the conclusion of the mutation testing and generate a report that details whether a particular mutant was executed and/or the success/failure of a particular test against each mutant so that the module 110 and/or a user a client computing device 102 can see if a corresponding mutant was detected by the test suite. In some embodiments, the mutant generation module 110 in conjunction with the test automation applications 112a-112c only run tests that cover the mutated line(s) or section(s) of the database function, and the module 110 can be configured to stop running tests against a mutated database function when the mutant is detected (e.g., according to an outcome of the test). Upon conclusion of the mutation testing, the mutant generation module 110 in conjunction with the test automation applications 112a-112c and reporting module 114 generates (214) an output file comprising the mutation coverage attributes as described above.

Figure 3:
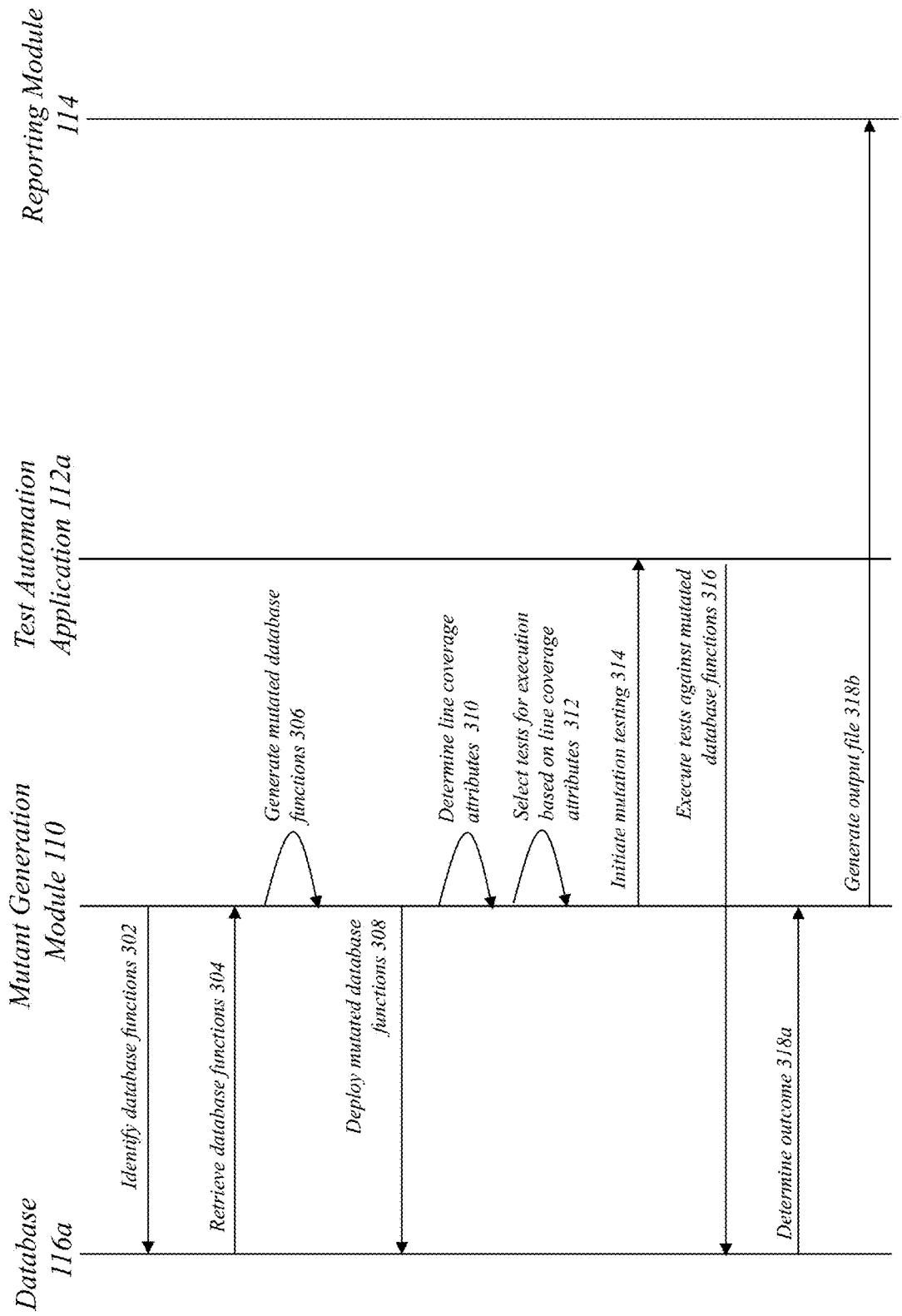
FIG. 3 is a workflow diagram of a computerized method of mutation testing of database functions.

FIG. 3 is a workflow ladder diagram of a computerized method 300 of mutation testing of database functions, using the system 100 of FIG. 1. Similar to FIG. 2, the method 300 of FIG. 3 shows a step-by-step workflow of how the system 100 performs the processes described above. The mutant generation module 110 identifies (302) one or more database functions in database 116a for mutation testing and retrieves (304) the identified database functions from the database (including, if necessary, creating a backup copy of the functions). The mutant generation module 110 generates (306) mutated database functions for the identified database function as explained previously. The mutant generation module 110 then deploys (308) the mutated database functions to the database 116a and determines (310) line coverage attributes for the mutated database functions. The mutant generation module 110 selects (312) one or more test for execution against the mutated database function(s) based upon the line coverage attributes for the mutated database function(s).

The mutant generation module 110 initiates (314) mutation testing via the test automation application 112a. The test automation application 112a executes (316) one or more of the selected tests against the mutated database functions and determines (318a) an outcome as described above. The mutant generation module 110 in conjunction with the test automation applications 112a-112c and reporting module 114 generates (318b) an output file (XML, HTML) as mentioned above for display on the client computing device 102.

Figure 4:
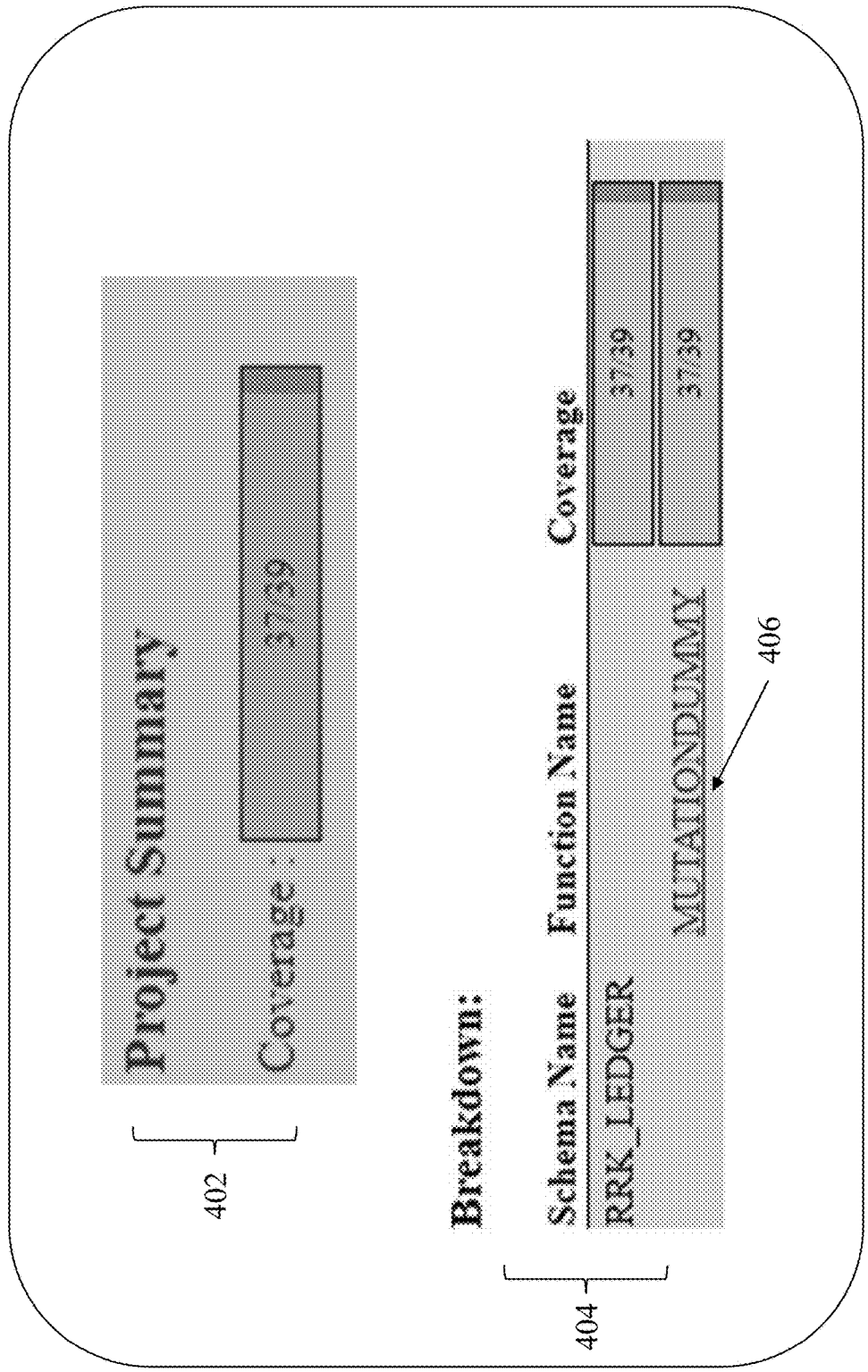
FIG. 4 is a diagram of an exemplary line coverage summary report generated by the reporting module.

FIG. 4 is a diagram of an exemplary line coverage summary report generated by the reporting module 114 using the output generated by the system 100. As shown in FIG. 4, the HTML page (index.html) includes a section 402 that shows the overall project summary line coverage and another section 404 that includes a breakdown of specific database functions (MUTATIONDUMMY) and the associated line coverage. Each database function comprises a link 406 to a particular detail page for the function that provides additional detail on the line coverage attributes.

Figure 5:
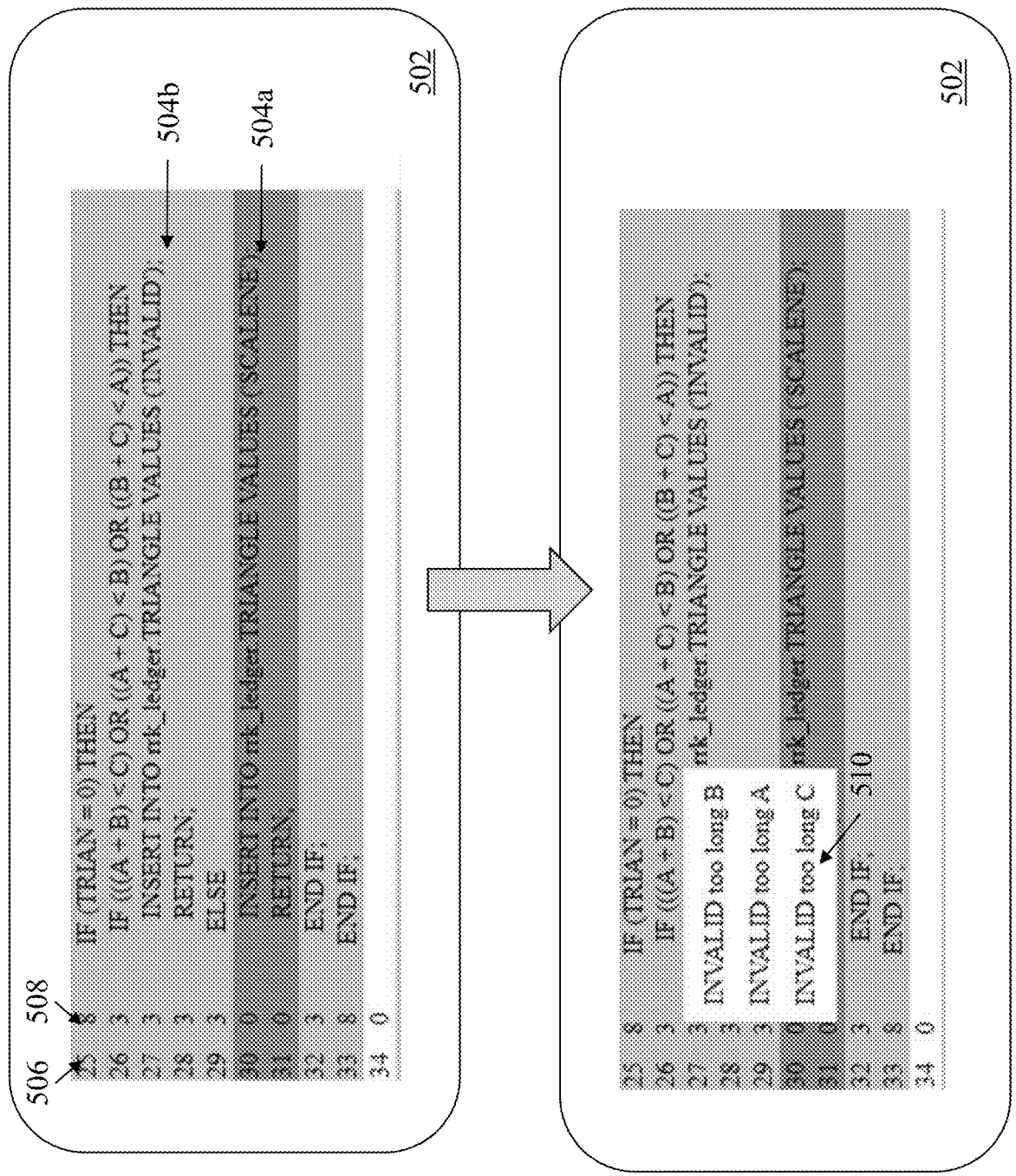
FIG. 5 is a diagram of an exemplary line coverage detail report generated by the reporting module.

FIG. 5 is a diagram of an exemplary line coverage detail report generated by the reporting module 114 using the output generated by the system 100. As shown in FIG. 5, the page 502 shows the code for the particular function which is color-coded according to the line coverage. Each line is either not highlighted, meaning it was not instrumented (e.g. comment lines), highlighted in a first color 504a (e.g. dark gray), meaning the line was not covered by the testing, or highlighted in a second color 504b (e.g. light gray), meaning the line was run by the tests. Each line of code includes a line number 506 and the number of tests 508 that covered the line. In this example, after interacting with the number of tests covering a line (e.g. via mouseover), the page includes a pop-up window 510 that identifies the particular tests covering the line.

Figure 6:
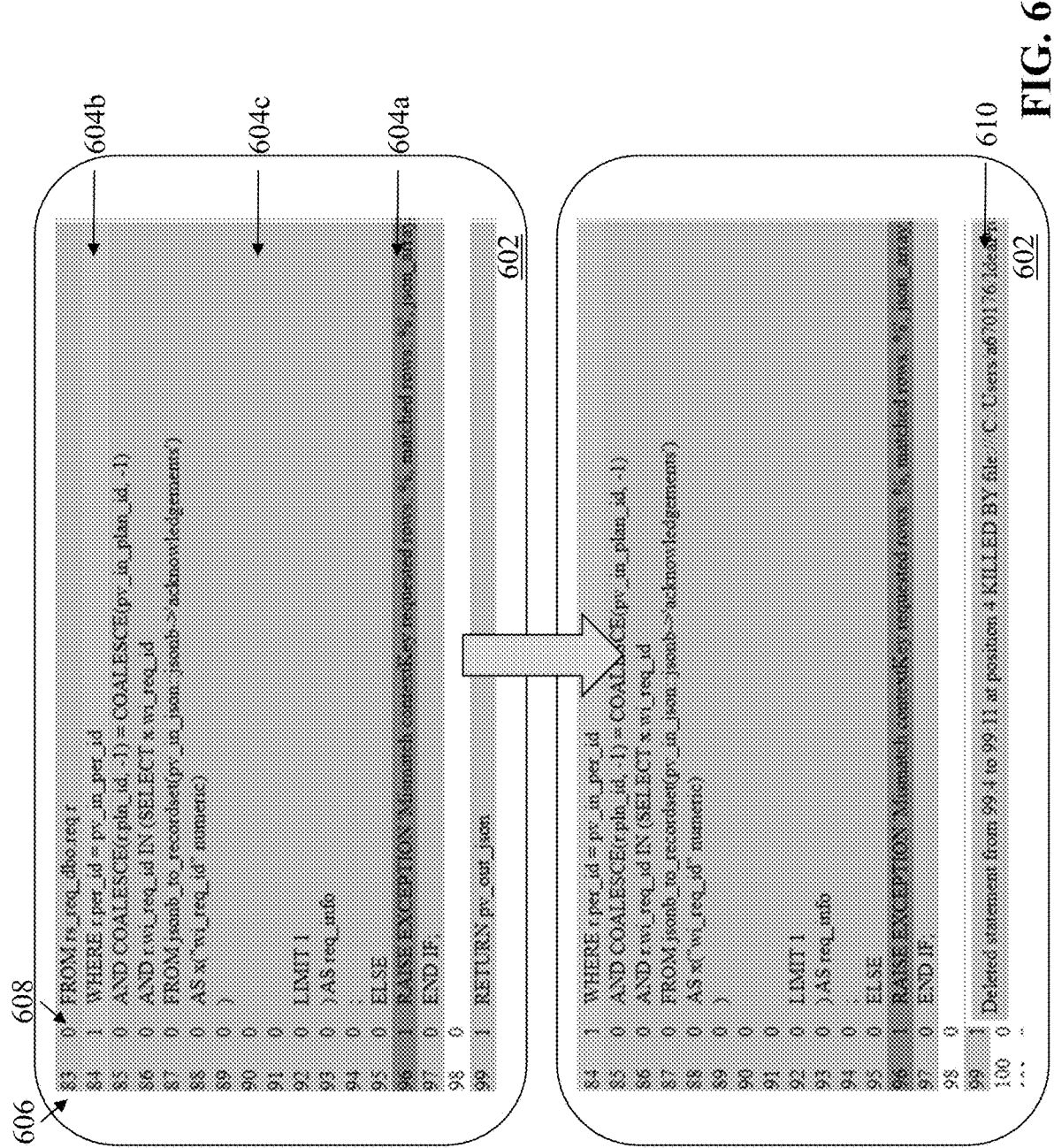
FIG. 6 is a diagram of an exemplary mutation coverage detail report generated by the reporting module.

FIG. 6 is a diagram of an exemplary mutation coverage detail report generated by the reporting module 114 using the output generated by the system 100. It should be appreciated that the reporting module 114, in some embodiments, can also generate a summary report for mutation coverage that links to the detail page of FIG. 6. As shown in FIG. 6, the detail page displays the code for the particular mutated database function. Each line of code is either not highlighted, meaning it was not instrumented (e.g. comment lines), highlighted in a first color 604a, meaning the line was not covered by the mutation testing, highlighted in a second color 604b, meaning that the line was covered by the mutation testing but some mutants on this line were not detected by the tests, or highlighted in a third color 604c, meaning the line was run by the tests and all mutants were detected. Each line of code also include a line number 606 but instead of the number of tests covering a line (as shown in FIG. 5), the report shows the number of mutants created 608 for a line. Interacting with this number (e.g., via mouseover) generates a pop-up window 610 which shows the mutant details and whether the mutant(s) were detected or not. If a mutant was detected, the pop-up window shows which test detected the mutant.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for mutation testing of database functions, the system comprising a computing device having a memory that stores computer-executable instructions and a processor that executes the computer-executable instructions to:
    identify one or more database functions for testing from at least one database;
    generate, for each identified database function, one or more mutated database functions by automatically applying one or more mutations to the identified database function that change one or more aspects of the identified database function, including inserting one or more probes into the identified database function that, when executed, add a line coverage record to a database table;
    deploy the mutated database functions to the at least one database;
    determine line coverage attributes associated with each mutated database function for a plurality of tests, comprising:
        selecting a first plurality of tests for execution against each mutated database function,
        executing each test in the first plurality of tests against each mutated database function using one or more test automation applications to generate, via the one or more probes, line coverage records associated with the mutated database function for each test executed against the mutated database function, and
        generating line coverage attributes for each mutated database function based upon the corresponding line coverage records;
    select a second plurality of tests for execution against each mutated database function based upon the line coverage attributes for each mutated database function, including filtering out one or more tests that, based upon the line coverage attributes, do not execute at least a portion of the mutated database function;
    execute the selected second plurality of tests against each mutated database function using one or more test automation applications to determine an outcome associated with each test of the second plurality of tests executed against the mutated database functions; and
    generate an output file comprising the outcome associated with each test of the second plurality of tests executed against the mutated database functions for display on a remote computing device.

2. The system of claim 1, wherein the one or more database functions comprise database stored procedures.

3. The system of claim 2, wherein automatically applying one or more mutations to the identified database function that change one or more aspects of the identified database function comprises deleting one or more of: a statement in the identified database function, an operator in the identified database function, a negation value in the identified database function, a keyword in the identified database function, or a clause in the identified database function.

4. The system of claim 2, wherein automatically applying one or more mutations to the identified database function that change one or more aspects of the identified database function comprises replacing a first operator in the identified database function with one or more other operators.

5. The system of claim 1, wherein deploying the mutated database functions to the at least one database comprises:
    creating a backup copy of each identified database function; and
    replacing each identified database function in the at least one database with the corresponding one or more mutated database functions.

6. The system of claim 5, wherein after executing the selected second plurality of tests against each mutated database function, the server computing device restores each identified database function to the at least one database using the corresponding backup copy and deletes the corresponding mutated database function.

7. The system of claim 1, wherein the outcome associated with each of the selected second plurality of tests executed against each mutated database function comprises an indicator of success associated with execution of each of the selected second plurality of tests executed against each mutated database function or an indicator of failure associated with execution of each of the selected second plurality of tests executed against each mutation database function.

8. The system of claim 1, wherein the line coverage attributes comprise a percentage of lines of the corresponding mutated database function that are executed by the first plurality of tests.

9. The system of claim 1, wherein the output file comprises the line coverage attributes.

10. The system of claim 9, wherein the output file comprises one or more HTML files that are used to generate a visual representation of one or more of the line coverage attributes or the outcome.

11. The system of claim 1, wherein the at least one database includes a relational database.

12. A computerized method of mutation testing of database functions, the method comprising:
    identifying, by a computing device, one or more database functions for testing from at least one database;
    generating, by the computing device for each identified database function, one or more mutated database functions by automatically applying one or more mutations to the identified database function that change one or more aspects of the identified database function, including inserting one or more probes into the identified database function that, when executed, add a line coverage record to a database table;
    deploying, by the computing device, the mutated database functions to the at least one database;
    determining, by the computing device, line coverage attributes associated with each mutated database function for a plurality of tests, comprising:
        selecting a first plurality of tests for execution against each mutated database function,
        executing each test in the first plurality of tests against each mutated database function using one or more test automation applications to generate, via the one or more probes, line coverage records associated with the mutated database function for each test executed against the mutated database function, and generating line coverage attributes for each mutated database function based upon the corresponding line coverage records;

selecting, by the computing device, a second plurality of tests for execution against each mutated database function based upon the line coverage attributes for each mutated database function, including filtering out one or more tests that, based upon the line coverage attributes, do not execute at least a portion of the mutated database function;

executing, by the computing device, the selected second plurality of tests against each mutated database function using one or more test automation applications to determine an outcome associated with each test of the second plurality of tests executed against the mutated database functions; and generating, by the computing device, an output file comprising the outcome associated with each test of the second plurality of tests executed against the mutated database functions for display on a remote computing device.

13. The method of claim 12, wherein the one or more database functions comprise database stored procedures.

14. The method of claim 13, wherein automatically applying one or more mutations to the identified database function that change one or more aspects of the identified database function comprises deleting one or more of: a statement in the identified database function, an operator in the identified database function, a negation value in the identified database function, a keyword in the identified database function, or a clause in the identified database function.

15. The method of claim 13, wherein automatically applying one or more mutations to the identified database function that change one or more aspects of the identified database function comprises replacing a first operator in the identified database function with one or more other operators.

16. The method of claim 12, wherein deploying the mutated database functions to the at least one database comprises:

creating a backup copy of each identified database function; and replacing each identified database function in the at least one database with one or more of the corresponding mutated database functions.

17. The method of claim 16, wherein after executing the selected second plurality of tests against each mutated database function, the server computing device restores each identified database function to the at least one database using the corresponding backup copy and deletes the corresponding mutated database function.

18. The method of claim 12, wherein the outcome associated with each of the selected second plurality of tests executed against each mutated database function comprises an indicator of success associated with execution of each of the selected second plurality of tests executed against each mutated database function or an indicator of failure associated with execution of each of the selected second plurality of tests executed against each mutation database function.

19. The method of claim 12, wherein the line coverage attributes comprise a percentage of lines of the corresponding mutated database function that are executed by the first plurality of tests.

20. The method of claim 12, wherein the output file comprises the line coverage attributes.

21. The method of claim 20, wherein the output file comprises one or more HTML files that are used to generate a visual representation of one or more of the line coverage attributes or the outcome.

22. The method of claim 12, wherein the at least one database includes a relational database.

* * * * *